United States Patent [19]

Lunz et al.

[11] Patent Number: 5,179,515
[45] Date of Patent: Jan. 12, 1993

[54] NEUTRON FLUX DETECTOR POSITIONING

[75] Inventors: Kenneth G. Lunz, Fox Chapel; Kevin P. Litzinger, Level Green, both of Pa.

[73] Assignee: Westinghouse Electric Corp., Pittsburgh, Pa.

[21] Appl. No.: 494,510

[22] Filed: Mar. 16, 1990

[51] Int. Cl.$^5$ .................. G06F 15/46; G21C 17/00
[52] U.S. Cl. ................. 364/167.01; 364/469; 364/551.01; 376/254; 376/258
[58] Field of Search .......... 364/167.01, 142, 174, 364/183, 550, 551.01, 565, 527, 469, 571.01; 376/254, 258; 73/159, 160; 250/391, 392, 390.01, 390.12

[56] References Cited

U.S. PATENT DOCUMENTS

| | | | |
|---|---|---|---|
| 3,860,824 | 1/1975 | Stone | 376/254 X |
| 4,239,595 | 12/1980 | Oates et al. | 176/19 |
| 4,255,234 | 3/1981 | Neuner et al. | 376/254 |
| 4,268,354 | 5/1981 | Wassel et al. | 376/254 |

FOREIGN PATENT DOCUMENTS 2042167 11/1980 United Kingdom .

OTHER PUBLICATIONS

"Brochure for Digital flux mapping system" from Westinghouse Nuclear Services Integration Division.
Wassel et al., "A microprocessor based automatic flux mapping system for pressurized water reactors", IEEE Transactions on Nuclear Science, vol. NS-26, No. 1, Feb. 1979.

*Primary Examiner*—Joseph Ruggiero
*Attorney, Agent, or Firm*—M. G. Panian

[57] ABSTRACT

Fine and coarse resolvers are used to detect the length of cable withdrawn from a spool to provide an indication of the position of a neutron flux detector at the end of the cable. The position indicated by the resolvers when the neutron flux detector passes a withdrawn limit switch is stored in nonvolatile memory as an offset when the cable is first installed in a flux mapping system. Thereafter, the position indicated by the resolvers, each time the neutron flux detector passes the withdraw limit switch, is compared to the offset. If the difference between the two is significant, a warning is generated, but operation of the flux mapping system continues. During movement of the flux detector, the change in position between two readings of the resolvers is divided by an amount of time measured by a programmable interval timer to determine average speed. A warning is generated if the average speed is outside an expected range. The expected range may vary depending upon the position of the detector. The position indicated by the resolvers when the flux detector indicates a reduction in neutron flux due to the presence of grid straps is compared with predetermined grid strap positions to determine an accurate top of thimble limit.

13 Claims, 10 Drawing Sheets

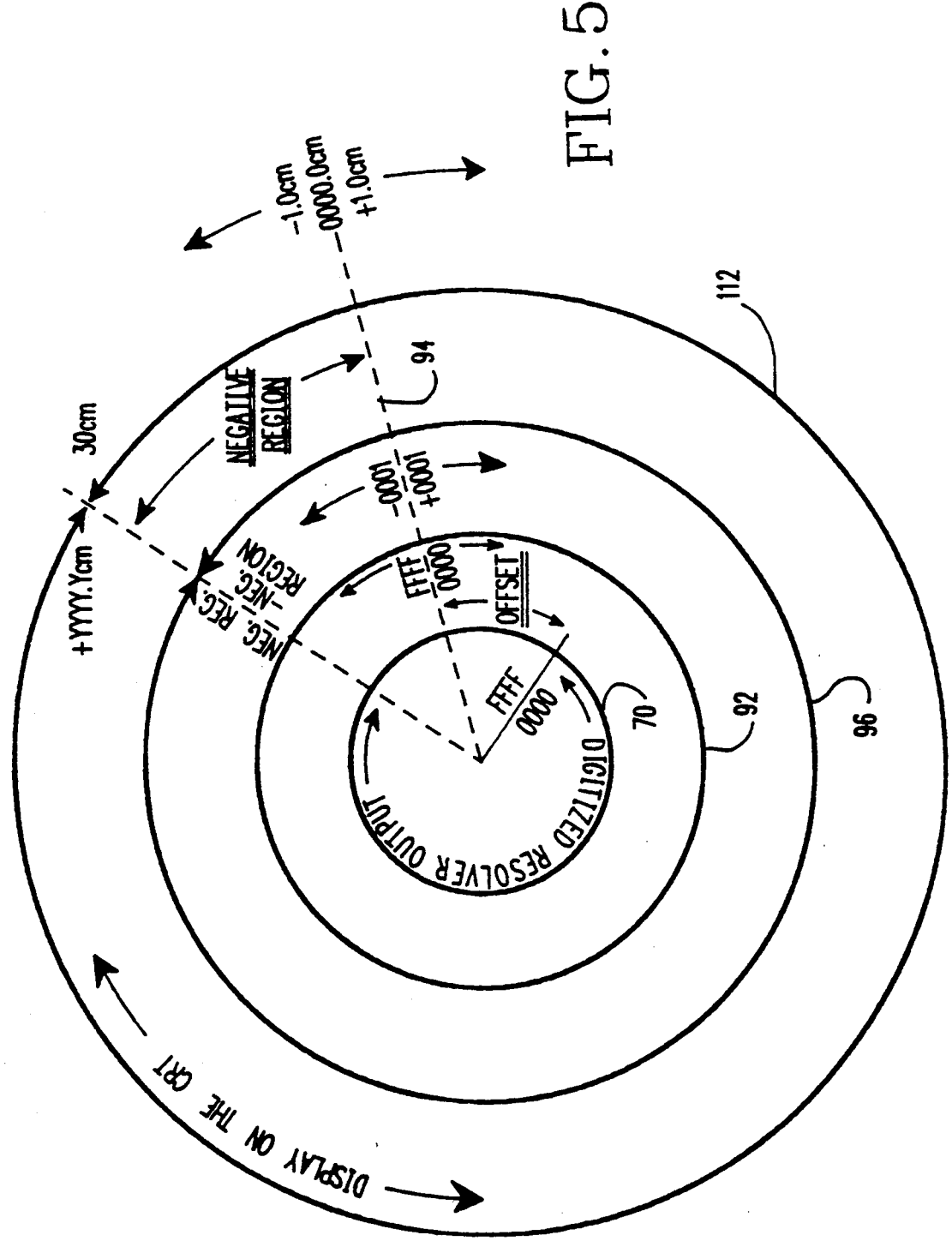

NEUTRON FLUX DETECTOR POSITIONING

BACKGROUND OF THE INVENT

1. Field of the Invention

The present invention relates to flux mapping controlling the positioning of detectors in thimbles of a flux mapping system.

2. Description of the Related Art

Nuclear reactors include incore and excore detectors, i.e., detectors which are positioned inside the nuclear reactor core and detectors which are outside the core but inside the containment. Flux detectors, for example, may be used both inside the core and outside the core. In both cases, the flux detectors measure neutron flux emanating from the fuel in the core. The incore flux detectors are inserted into thimbles which pass through the core. The incore flux detectors are then drawn out of the core at a predetermined rate to produce a flux map along each thimble.

A pressurized water nuclear reactor typically has approximately sixty thimbles, but may have only four detectors. Multiple-path selectors are used to route the detectors into the thimbles. All or a portion, e.g., a quadrant, of the core may be mapped at a given time. Typically, all, e.g., four detectors are inserted into difrferent thimbles simultaneously so that the map can be produced as quickly as possible while conditions in the core undergo little change.

Precise positioning of the detectors is important since the purpose of the flux mapping system is to measure neutron flux values at different positions in the core 12. If the positions cannot be determined accurately and precisely, the flux map is not as useful as it should be. In addition, it is important that the flux map be determined as quickly as possible, since conditions in the core can change while the core is being mapped. If one of the four detector drivers 24 is unavailable due to a mechanical breakdown or inaccuracy in its position sensing system, at least one third more time would be required and in many prior art systems twice as much time total would be required to perform flux mapping of the core 12. Also, in the prior art, the ability to detect position of the flux detector could be lost if there was a loss of power when incremental resolvers were used and relatively lower reliability switches were used to verify the position of each detector, preventing use of the detector when the switches malfunctioned.

SUMMARY OF THE INVENTION

An object of the present invention is to provide a flux mapping system with improved detector positioning.

Another object of the present invention is to provide a flux mapping system with greater availability.

Yet another object of the present invention is to provide a flux mapping system that is easier to use, particularly when changing detector cables.

The above objects are attained by providing a method of controlling withdrawal of a strand from a storage unit, the strand having a total strand length, said method comprising the steps of: sensing a length of the strand withdrawn from the storage unit using a resolver, the resolver completing less than one revolution for the total strand length; and performing speed and position diagnostics based upon the length of the strand sensed in the previous step and a previous length sensed at a measured time interval earlier. In the preferred embodiment, the strand is a cable carrying a detector in a flux mapping system. When the detector passes a withdraw limit switch, the first time the cable is loaded into the storage unit, the reading of the resolver is stored as an offset in nonvolatile memory. Thereafter, when the detector passes the withdraw limit switch, the reading from the resolver is compared with the offset and a warning is generated if the reading from the resolver is significantly different from the expected value. In addition, the change in position over time indicated by the resolver is compared with a predetermined range of acceptable speeds and a warning is generated if the speed calculated from the change in position indicated by the resolver is outside the predetermined range of acceptable speeds.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 5 is a graphical representation of coordinate conversion; and

DESCRIPTION OF THE PREFERRED EMBODIMENT

Figure 1:
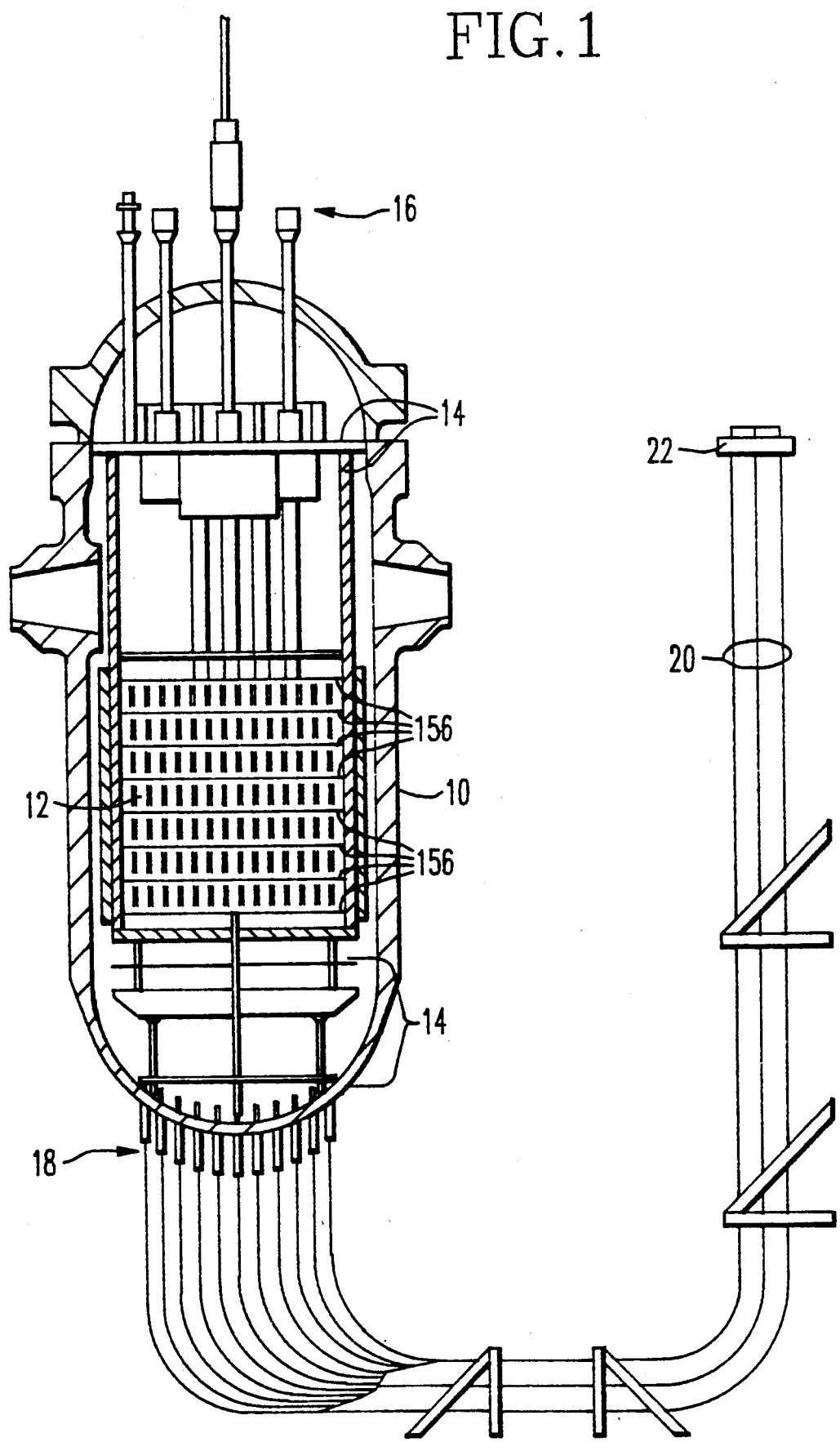
FIG. 1 is a schematic diagram of a nuclear reactor including an illustration of thimble guides.
Figure 2B:
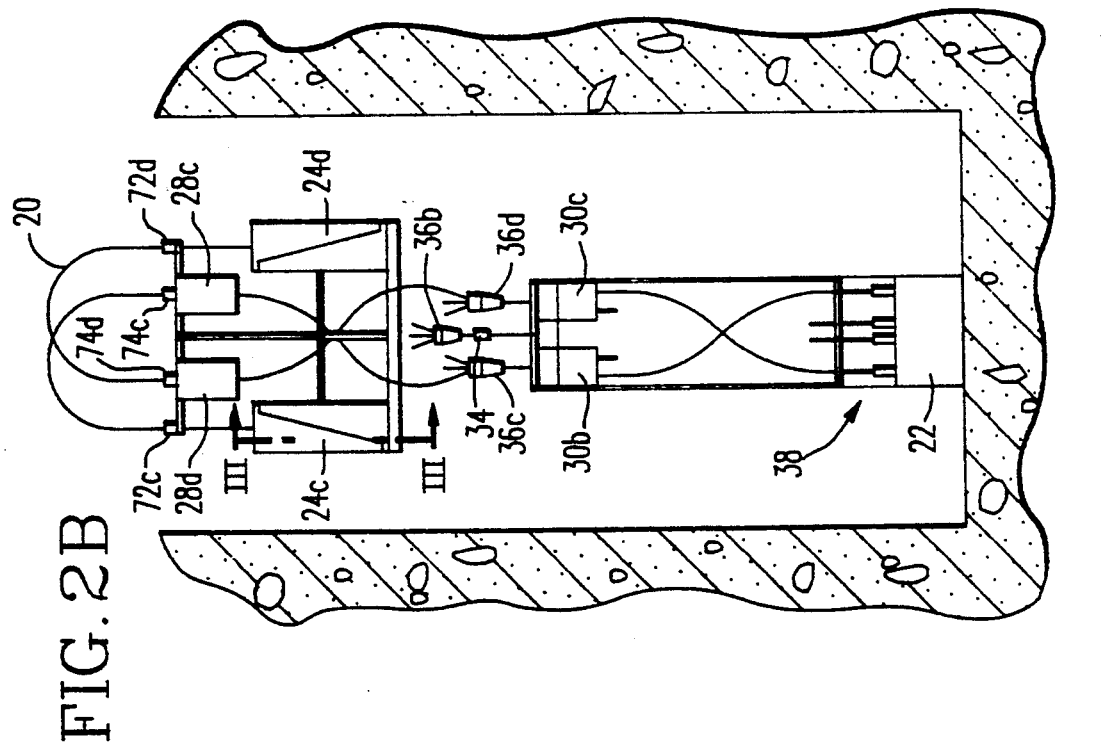
FIGS. 2A and 2B are front and side views of a drive system for a flux mapping system.
Figure 2A:
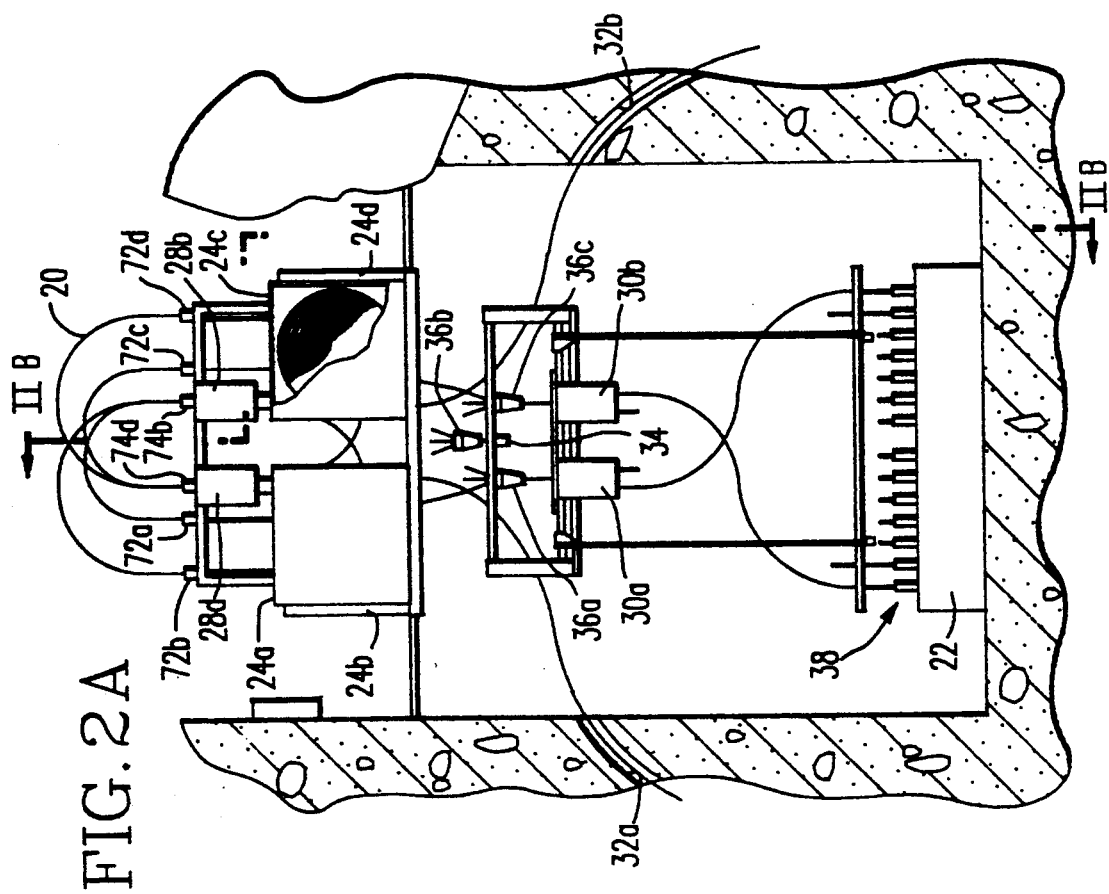

As illustrated in FIG. 1, a nuclear reactor vessel 10 contains a fuel assembly (core) 12 and support structures 14. Various instrumentation and drive devices 16 penetrate the vessel 10 from above. Thimble guide tubes 18 penetrate the vessel 10 from below. The detector cables 20 run from a seal table 22 to the thimble guide tubes 18 when mapping the core 12 of the reactor. As illustrated in FIG. 2A, four detector drivers 24a–24d drive detector cables 20 into four corresponding 6-path selectors 28b–28e (selector 28a corresponding to driver 24a is not illustrated in FIG. 2A or FIG. 2B). Each 6-path selector 28 selects one of four 15-path selectors 30a–30c (the fourth 15-path selector is not visible in either FIG. 2A or FIG. 2B), or one of four detector storage conduits of which two (32a and 32b) are illustrated in FIG. 2A, or a calibration path switch 34. The detector storage conduits 32 each correspond to one of the detector drivers 24. However, each of the 15-path selectors 30 and the calibration path switch 34 can receive detectors from any of the four detector drivers 24 via the 6-path selectors 28 and wyes 36a–36d (the fifth wye is not visible in either of FIGS. 2A and 2B).

Each 15-path selector 30 can select one of up to 15 thimble guide tubes 38. Thus up to 60 thimbles can be accessed by each detector driver 24 in the flux drive system arrangement illustrated in FIGS. 2A and 2B. As should be readily apparent from FIGS. 1, 2A and 2B, the length of cable required to reach from one of the detector drivers 24 to the top of the thimbles in the reactor 10 varies somewhat depending upon in which thimble the detector is located.

Figure 3:
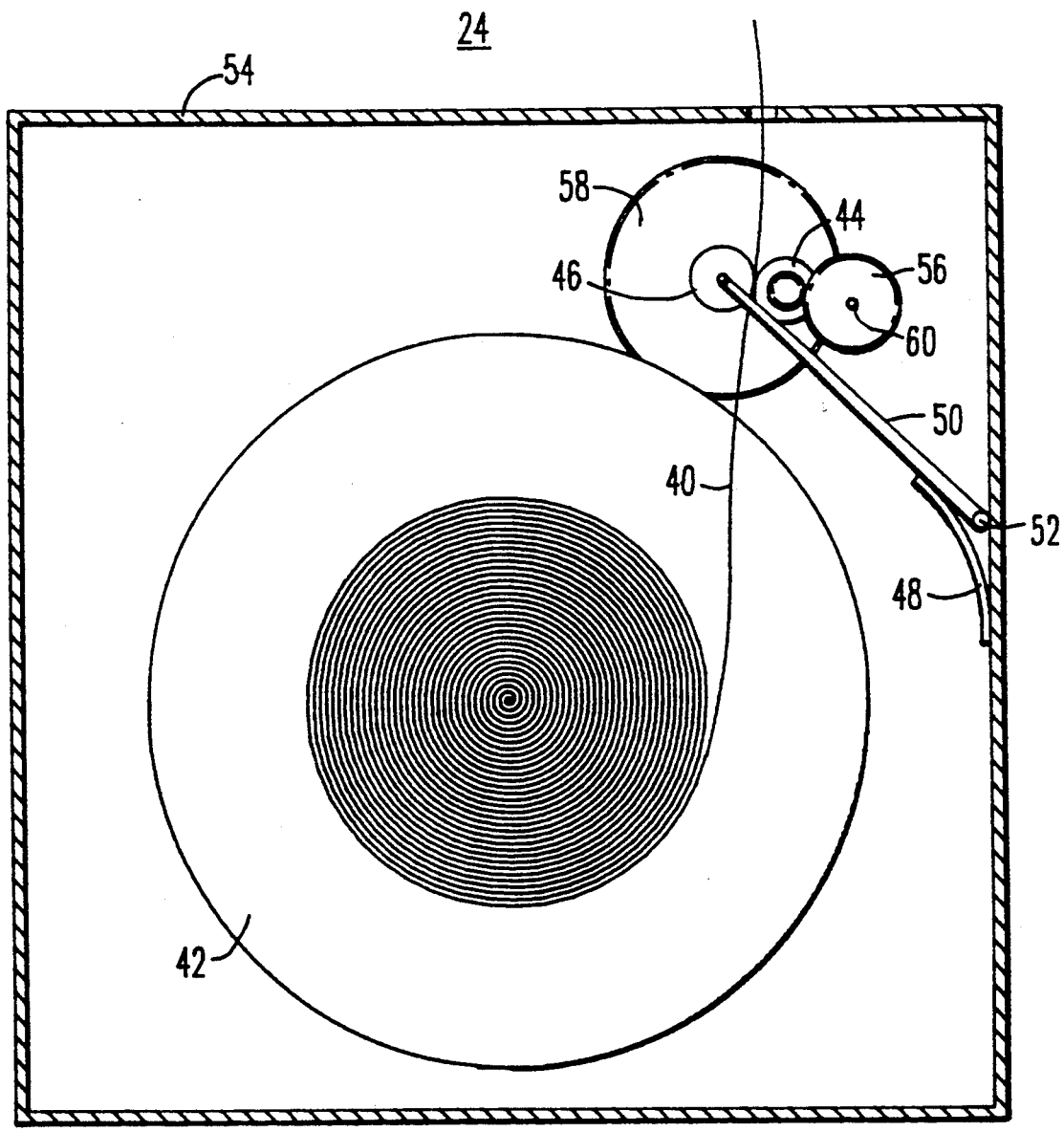
FIG. 3 is a front cross-sectional view of a detector driver.

A front cross-sectional view of a detector driver is illustrated in FIG. 3 showing how the cable 40 is wound on the spool 42. The cable 40 has a helical wrap which matches the driving surface of a drive wheel 44. The cable 40 is held against the drive wheel 44 by conventional means. The means illustrated in FIG. 3 and described below is intended to provide a conceptual understanding of the driver mechanics, rather than a mechanical design description, since the mechanical design is conventional. A tension roller 46 is illustrated in FIG. 3 as holding the cable 40 against the drive wheel 44 due to the force of a spring 48 acting on an arm 50 which pivots at a point 52 near a wall 54 which encloses the detector driver 24. The drive wheel 44 is in turn driven by conventional means which is not illustrated in FIG. 3. The gears 56, 58 in FIG. 3 represent resolvers which are driven by the drive wheel in approximately the proportion illustrated. A fine resolver 56 makes one revolution for every approximately four turns of the drive wheel 44. A coarse resolver 58 is driven by a gear (not shown) having a diameter approximately the same as the shaft 60 of the fine resolver 56. As a result, the fine resolver 56 can make approximately 32 revolutions for every revolution of the coarse resolver 58.

Resolver units including a fine and coarse resolver are available commercially from, e.g., NEOTECH, Inc. of Colmar, Pa., which provides the capability of detecting each change of 0.1 cm (0.04 in.) for about 4800 cm (160 ft.) of cable without the coarse resolver 58 making more than one revolution. This enables the resolver unit to be used as an absolute resolver provided the maximum distance to the top of each thimble is under 4800 cm. The actual arrangement of the fine and absolute resolvers in a commercial system may be different from that illustrated in FIG. 3 where the gearing is shown to aid in a conceptual understanding of the invention.

Figure 4:
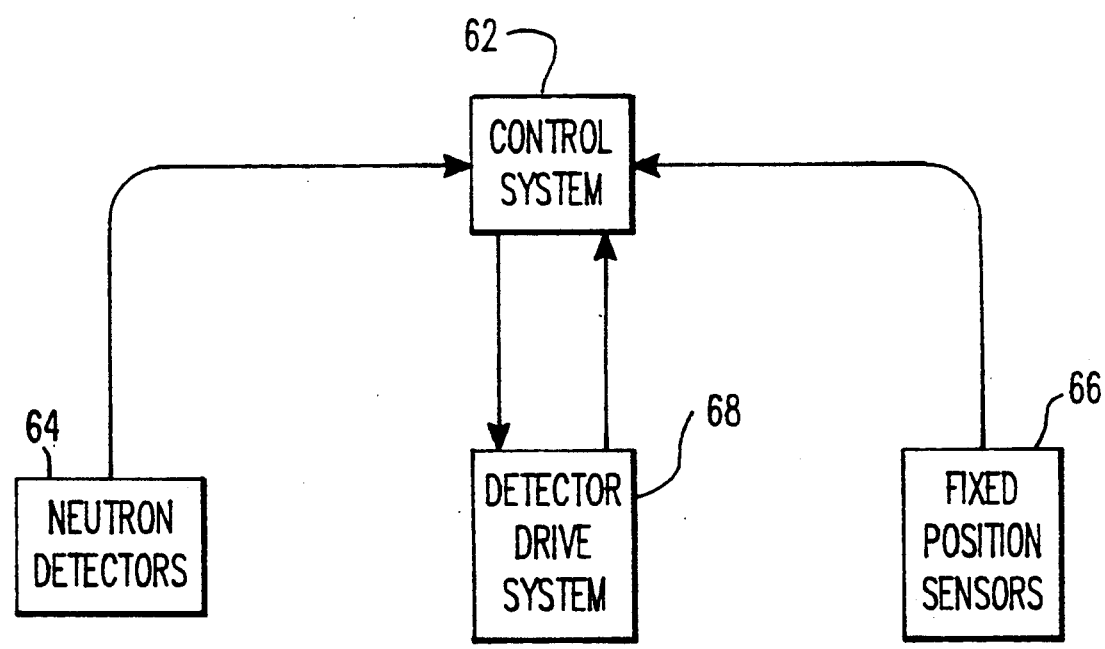
FIG. 4 is a block diagram of a flux mapping system.

As illustrated in FIG. 4, a flux mapping system basically includes a control system 62 which receives data from neutron detectors 64 and fixed position sensors 66 and controls a detector drive system 68 which includes the detector drivers 24 and selectors 28, 30. An input/output interface is provided for the detector drive system 68 which outputs the control signals to the detector drivers 24 and receives the signals from the resolvers 56, 58.

A graphical representation of how the position sensed by the resolvers 56, 58 is converted into a length of the cable 40 is illustrated in FIG. 5. The outputs from the resolvers 56, 58 are analog signals which are converted into digital signals by the input/output interface included in the detector drive system 68. The digital signals are combined to provide, in the case of the preferred embodiment, a 16-bit digital signal representative of the position of the detector on the end of the cable 40. This signal is represented by the innermost circle 70 in FIG. 5.

When cable 40 is initially mounted in a detector driver 24 which provides a storage unit for the cable 40, the resolver unit 56, 58 is calibrated to the cable 40. The fixed position sensors 66 include safety switches 72 and withdraw limit switches 74, one of each for each of the detector drivers 24. The safety switches are illustrated in FIGS. 2A and 2B as switches 72a-72d, respectively corresponding to detector drivers 24a-24d, while the withdraw limit switches 74b-74d are illustrated in FIGS. 2A and 2B, because the withdraw limit switch corresponding to detector driver 24a is not visible in either of FIGS. 2A and 2B. As the cable 40 is initially extracted from the spool 42, the cable 40 passes the safety switch 72 and the withdraw limit switch 74. Thereafter, when it is desired to withdraw a detector from a thimble, the detector is withdrawn beyond the withdraw limit switch 74.

Figure 6A:
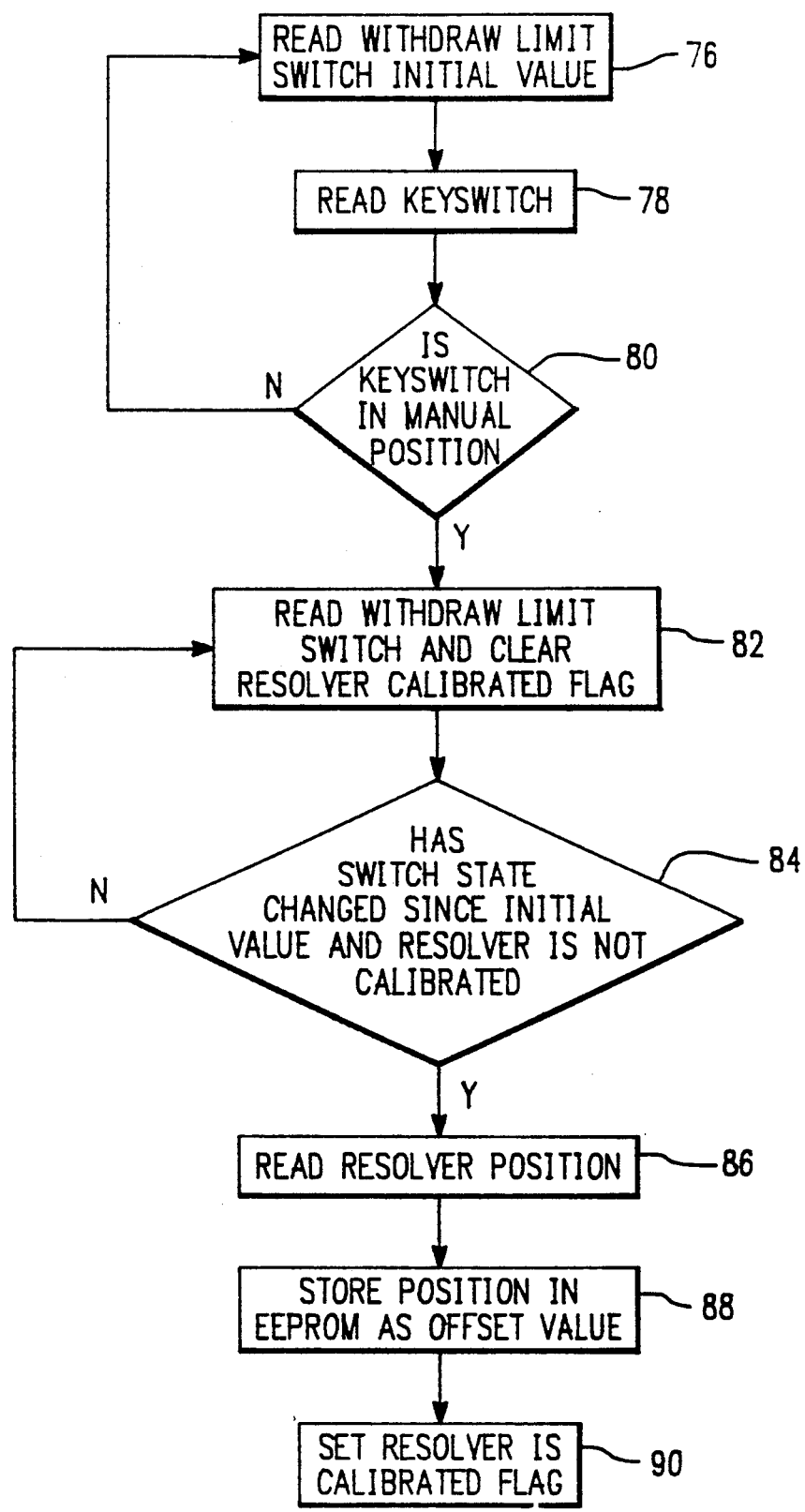
FIGS. 6A–6F are flowcharts of software used in a detector positioning system according to the present invention.

The procedure performed by the processor in the control system 62 to calibrate the cable and resolver is illustrated in FIG. 6A. First, any previously stored withdraw limit switch value is read 76 and the key switch controlling operation of the control system 62 is read 78. If it is determined 80 that the key switch is in the manual position indicating that calibration should be performed, the withdraw limit switch 74 is repeatedly read 82 until the detector mounted on the end of the cable 40 passes 84 the withdraw limit switch 74 in the calibration mode. At this time, the resolver position is read 86 from the input/output interface in digital form and stored 88 in nonvolatile memory. As indicated in FIG. 6A, the nonvolatile memory is preferably an electrically erasable programmable read only memory (EEPROM) in which the offset position will remain regardless of interruptions in the power supply to the control system 62. Finally, a flag is set 90 indicating that the resolver and cable are calibrated.

The amount of the offset is indicated in FIG. 5 as approximately the hexadecimal value FDFF, but it should be easily understood that the offset value could be any 16 bit value. When the offset is subtracted from the digitized resolver output, the hexadecimal representation of the position of the detector is generated as represented by circle 92 in FIG. 5 with the value zero at the withdraw limit switch 74 as indicated by dashed line 94. A negative region is predefined for hexadecimal values between FFFF and, e.g., FED4 which at 0.1 cm per least significant bit corresponds to a negative region of 30 centimeters. This figure is used in the preferred embodiment since the distance traveled by a detector between any safety switch 72 and the corresponding withdraw limit switch 74 is no more than 30 centimeters. Depending upon the particular application of the present invention, the negative region can be increased or not even provided. The third circle 96 from the center represents the adjusted hexadecimal output having a negative region.

Figure 6B:
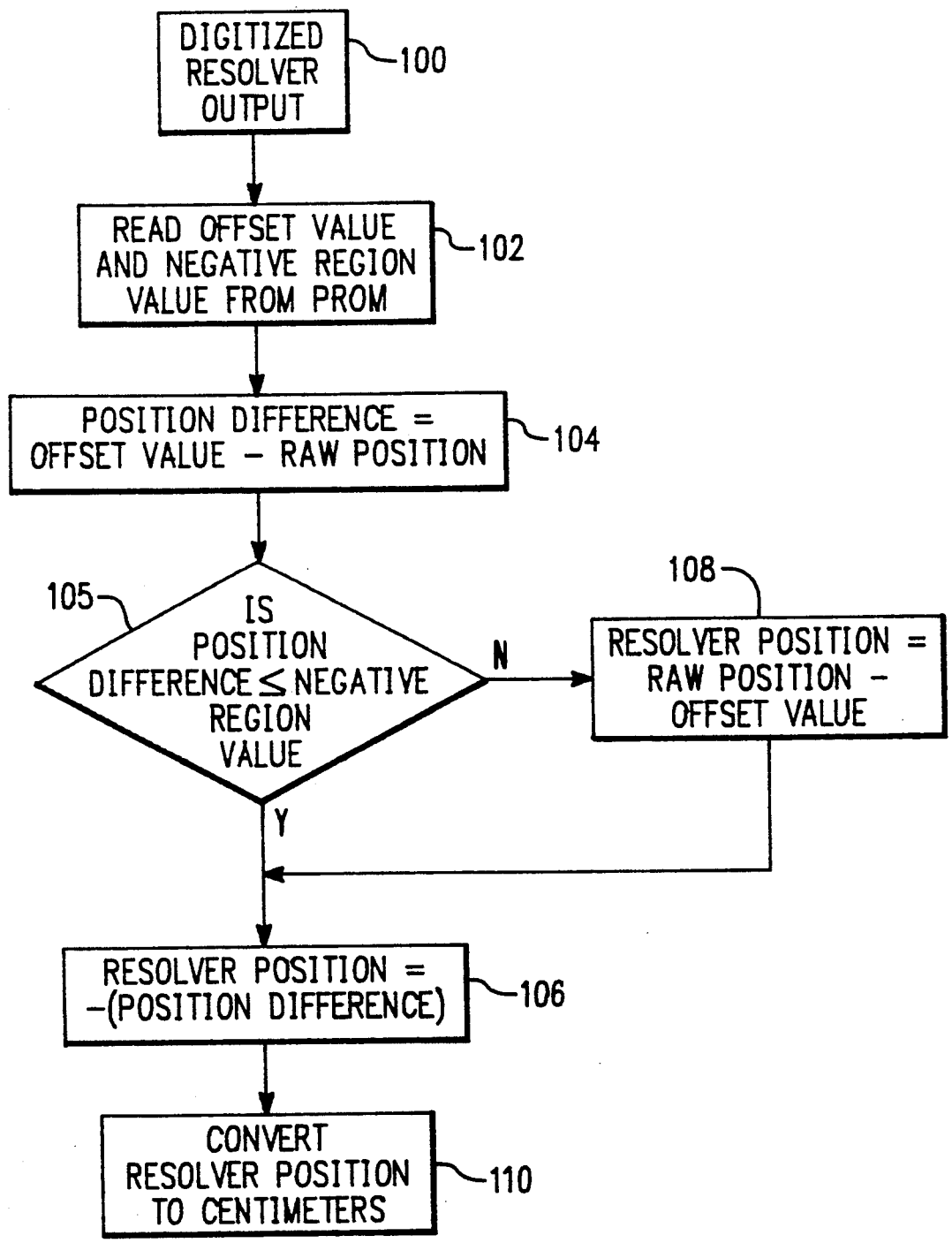

When one of the detector drivers is operated, the control system 62 performs the procedure illustrated in FIG. 6B to determine the position of the detector. The digitized resolver output is read 100 from the input/output interface and the offset value and negative region value are read 102 from the EEPROM. The position difference is assigned 104 the difference between the offset value and the raw position. The position difference is compared 105 to the negative region value and if less than or equal to the negative region value, the resolver position is assigned 106 a negative value using the absolute value of position difference. Otherwise, the resolver position is assigned 108 a positive value of the difference between the raw position and the offset value. Finally, the resolver position is converted 110 into centimeters or other desired measurement units, for display on, e.g., a CRT in the control system 62. The value in centimeters is represented by the outermost circle 112 in FIG. 5.

Figure 6C:
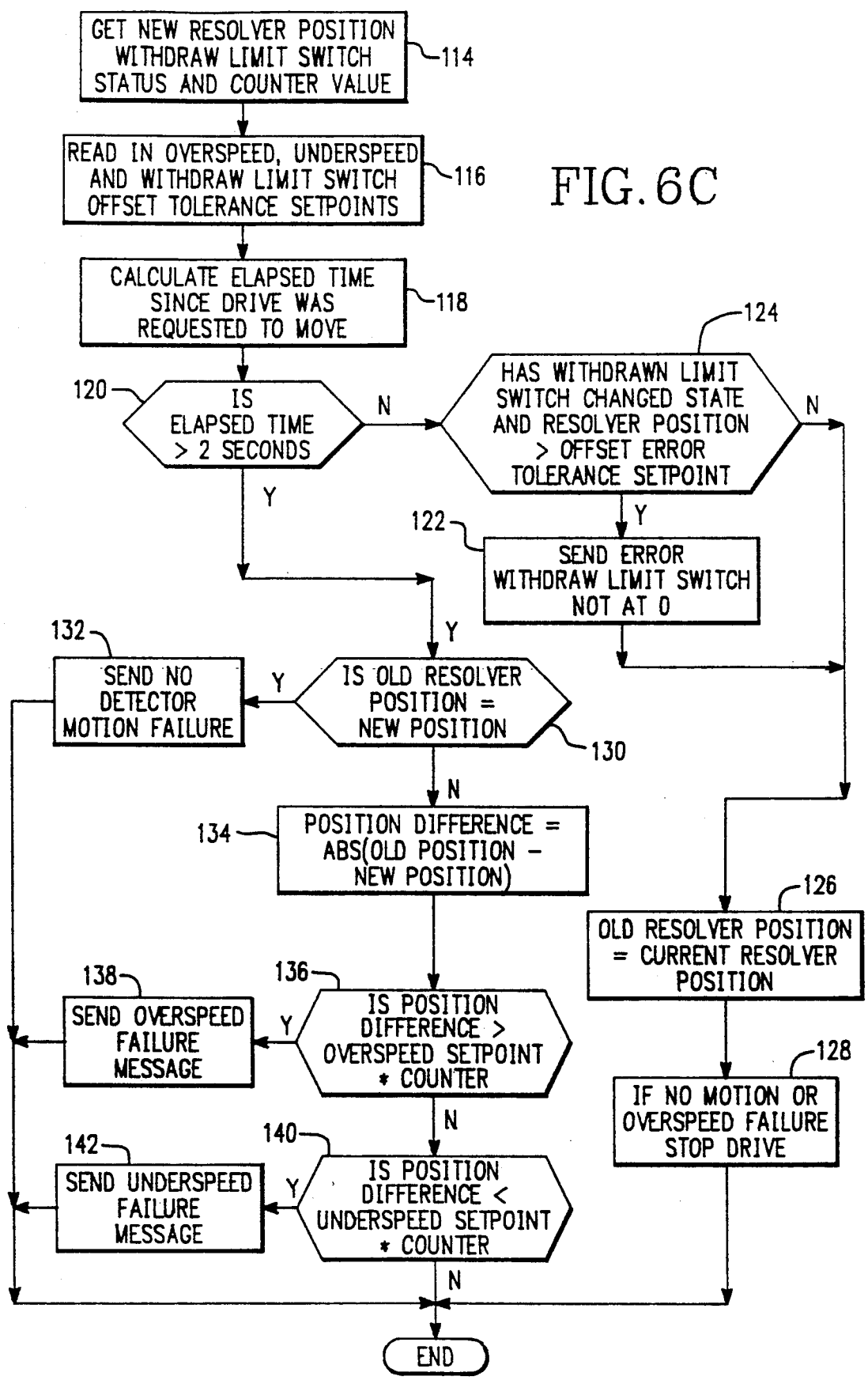
Figure 6D:
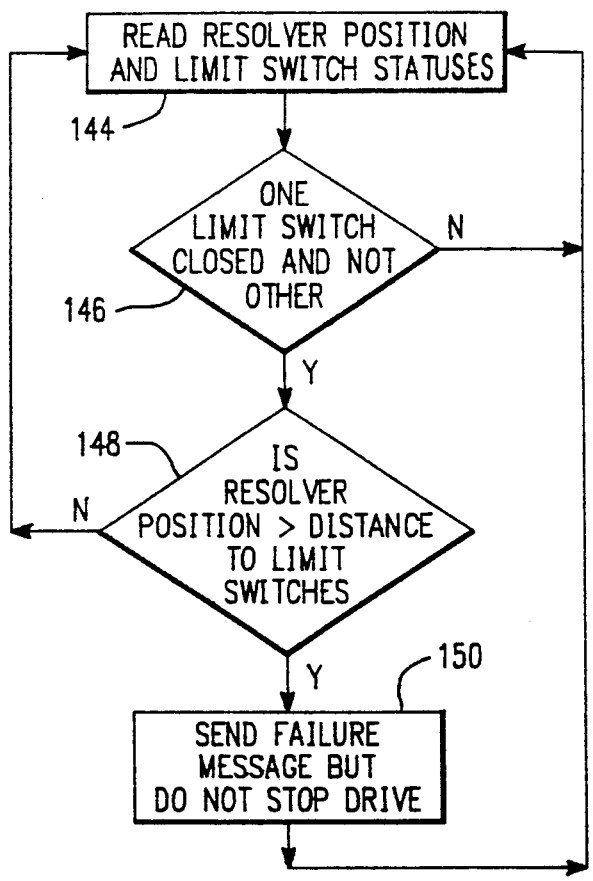
Figure 6E:
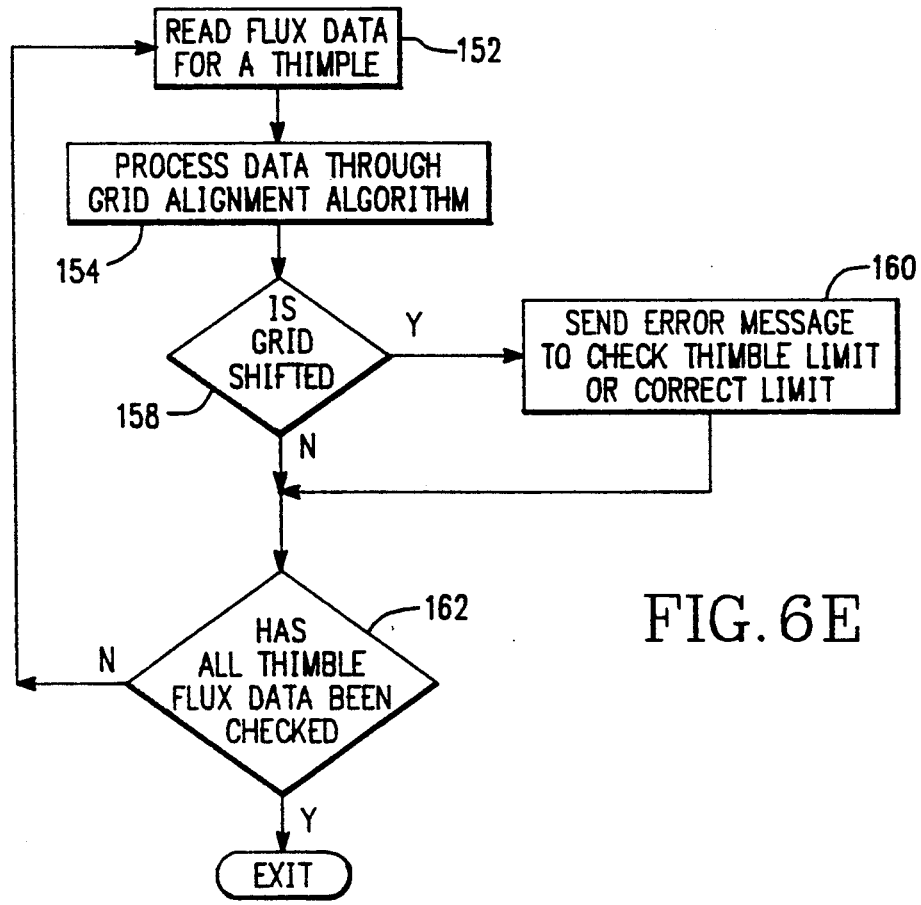

According to the present invention, a number of diagnostics are performed by the control system 62 using the resolver position calculated as described above. A number of speed and position diagnostics are illustrated in FIG. 6C. The resolver position produced as described above with reference to FIG. 6B is read 114 together with the status of the withdraw limit switch and the current counter value of a programmable interval timer. Next, previously determined overspeed and underspeed tolerance setpoints defining an acceptable range of speeds are read 116 together with a withdraw limit switch tolerance value. Using the data read in step 114, the elapsed time is calculated 118 since a previous pass through the procedure illustrated in FIG. 6C. The elapsed time is compared 120 with a predetermined value, such as 2 seconds and if less time has elapsed, a warning message is output 122, if 124 the withdraw limit switch has changed state and resolver position is greater than the offset error tolerance setpoint. In addition, the old resolver position stored by the control system is assigned 126 the current resolver position and the detector driver 24 is stopped 128.

If the elapsed time is greater than 2 seconds in step 120, the old resolver position is compared 130 with the new position and if the values are the same a no detector motion failure warning is output 132. If there has been motion, the change in position is assigned 134 the absolute value of the difference between the old and new positions. The position difference is compared 136 with the overspeed setpoint times the counter value and an overseed failure message is output 138 if the position difference is greater. The position difference is also compared 140 with the underspeed setpoint times the counter value and an underspeed failure message 142 is output if the position difference is too small.

Other types of diagnostics which can be performed include comparing the status of limit switches to confirm that they are operating properly. After reading 144 the resolver position and limit switch status, the statuses of the limit switches can be compared 146. If they are both the same, no error will be detected. However, if they are different, the resolver position is compared 148 with the distance to the farthest limit switch. If the resolver position does not indicate that both limit switches should be set, no error will be detected However, if both limit switches should indicate that the detector has passed, but one of the limit switches does not provide such an indication, a failure message is generated 150 and the appropriate limit switch is indicated as having failed. However, flux mapping continues in the preferred embodiment, since the resolvers are considered to be more reliable than the limit switches.

Another type of diagnostic which is performed by a system according to the preferred embodiment uses data from the detectors 64. As the flux data is received, or read 152 if the diagnostics are performed offline, the flux data can be compared with grid alignment data or processed 154 by a grid alignment algorithm. In the core 12 (FIG. 1) of the reactor 10, grid straps 156 are a structural component which causes the amount of flux detected by the detectors 64 to be lower at predictable points. Thus, a determination 158 can be made whether the grid has apparently shifted. If so, an error message can be generated 160 to check or automatically correct the top of thimble limit for that thimble. The process is repeated until it is determined 162 that all thimbles have been checked.

Figure 6F:
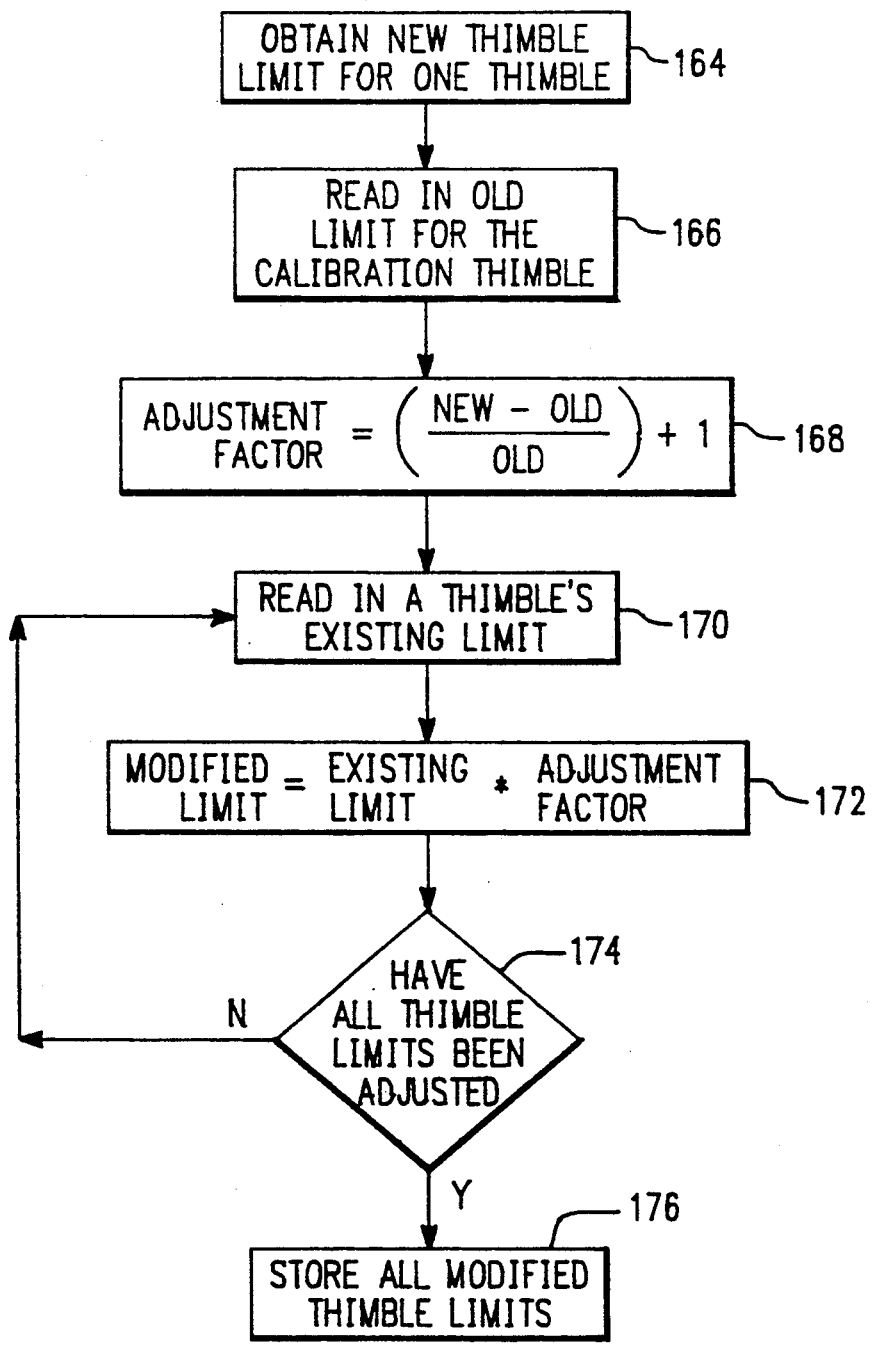

With accurate detector position data, it is also possible to readjust the top of thimble limits when a new detector cable 40 is mounted without actually running the detector cable 40 into all of the thimbles. As illustrated in FIG. 6F, after obtaining 164 a new thimble limit for at least one thimble, the old limit for that thimble, referred to as the calibration thimble, is read 166 and an adjustment factor calculated 168. Then each thimble's existing limit can be read 170 and multiplied 172 times the adjustment factor. When it is determined 174 that all thimble limits have been adjusted, the modified thimble limits 176 can be stored. Of course, the modified thimble limits could be stored individually inside the loop of blocks 170, 172 and 174.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described. For example, while the present invention has been described as applying to detecting the length of cables, the length of other strands, from monofilament line to a flat sheet or web, could be measured in other systems. Accordingly, suitable modifications and equivalents may be resorted to, all falling within the scope and spirit of the invention.

What is claimed is:

1. A method of controlling withdraw of a strand from a storage unit, the strand having a total strand length, said method comprising the steps of:
   (a) sensing a length of the strand extracted from the storage unit using a resolver, the resolver completing less than one revolution for the total strand length;
   (b) performing speed and position diagnostics based upon the length of the strand sensed in step (a) and a previous length sensed a measured time interval earlier; and
   (c) calibrating an offset using an initial reading received from the resolver when an end of the strand reaches a known position after the strand is initially loaded into the storage unit.

2. A method as recited in claim 1, further comprising the step of (d) storing the offset in nonvolatile memory.

3. A method as recited in claim 1, wherein said performing the step (b) includes the steps of:
   (b1) receiving an indication of the end of the strand reaching the known position;
   (2) checking the length sensed in step (a) every time the indication is received in step (b1); and
   (b3) generating a warning when the length checked in step (b1) does not correspond to the offset determined by said calibrating in step (c).

4. A method as recited in claim 1, wherein said performing in step (b) includes the steps of:
   (b1) performing said sensing in step (a) repeatedly;
   (b2) measuring elapsed times between said sensing of the length and the previous length;
   (b3) calculating an average speed by subtracting the previous length from the length to produce a difference therebetween and dividing the difference by the elapsed time; and
   (b4) generating a warning when the average speed is outside a predetermined range of acceptable speeds.

5. A system for controlling a length of strand withdrawn from a storage unit, the strand having a total strand length, comprising:

a reservoir for sensing the length of the strand extracted from the storage unit, said resolver completing less than one revolution for the total strand length; and diagnostic means for performing speed and position diagnostics based upon the length of the strand and a previous length sensed a measured time interval earlier;

a programmable interval timer for measuring the measured time interval between each sensing of the length;

a withdraw limit switch for sensing when an end of the strand reaches a withdraw limit position; and a processor for calibrating an offset using an initial reading received from said resolver when an end of the strand reaches the withdraw limit position and for detecting when the length sensed by said resolver, at each time said withdraw limit switch indicates the end of the strand has reached the withdraw limit position, does not correspond to the offset.

6. A system as recited in claim 5, wherein the strand is a cable, wherein said system further comprises a sensor, mounted on the end of the cable, capable of sensing conditions indicative of positioning of the end of the cable, and wherein said processor controls a maximum amount of extraction of the cable in dependence upon the positioning sensed by said sensor.

7. A system as recited in claim 6, wherein said sensor is a flux detector in a flux mapping system, the conditions indicative of positioning are reduced neutron flux near grid straps and the maximum amount of extraction of the cable is a top of thimble limit.

8. A system as recited in claim 7, wherein said resolver is a coarse resolver making less than one revolution to the maximum amount of extraction of the cable, and wherein said system further comprises:

a fine resolver making multiple revolutions per revolution of said coarse resolver, each of said coarse and fine resolvers producing signals indicative of rotary position; and an input/output interface combining the signals from said course and fine resolvers to produce a digital length of cable signal supplied to said processor.

9. A method of controlling positioning of neutron flux detectors in a flux mapping system for a pressurized water nuclear reactor, the neutron flux detectors attached to ends of cables stored on spools and routed into thimbles, one of the thimbles having a top located a maximum distance from the spools, said method comprising the steps of :

(a) sensing resolver positions of resolver units, each resolver unit corresponding to one of the cables and including a coarse resolver completing less than one revolution when the corresponding cable is extended the maximum distance;

(b) receiving a withdraw limit signal from one of a plurality of withdraw limit switches when a corresponding flux detector on the corresponding cable reaches the one of the withdraw limit switches;

(c) calibrating each resolver unit by storing the resolver position as an offset when the withdraw limit signal is received after a corresponding cable is initially loaded on the reel in the flux mapping system;

(d) converting the resolver position to a cable length by subtracting the offset stored in step (c) and multiplying by a conversion factor;

(e) generating a warning when the cable length, produced by said converting performed when the withdraw limit switch is received after said calibrating has been performed, is different from zero by a predetermined amount; and (f) continuing operation of the flux mapping system when the warning is generated in step (e).

10. A method as recited in claim 9, further comprising the steps of:

(g) repeatedly performing said converting in step (d);

(h) measuring elapsed time between said converting producing the cable length and said converting producing a previous cable length;

(i) calculating an average speed by subtracting the previous length from the length to produce a difference therebetween and dividing the difference by the elapsed time; and (j) generating a warning when the average speed is outside a predetermined range of acceptable speeds.

11. A method as recited in claim 9, further comprising the steps of:

(g) determining top of thimble lengths for any two of the thimbles in the flux mapping system when said calibrating is performed in step (c) by manually extending the corresponding cable to the top of each of the two thimbles; and (h) calculating top of thimble limits for all remaining thimbles in dependence upon the top of the thimble lengths and a relationship between previous top of thimble limits of all of the thimbles.

12. A method as recited in claim 9, further comprising the steps of:

(g) comparing sensed positions of the flux detectors, for changes in neutron flux detected by the neutron flux detectors, with expected positions for flux changes caused by grid straps in the nuclear reactor; and (h) indicating adjustment of a top of thimble limit for each of the thimbles as necessary in dependence upon said comparing in step (g).

13. A method as recited in claim 9, wherein each resolver unit further includes a fine resolver making multiple revolutions per revolution of the coarse resolver, and wherein said sensing in step (a) comprises:

(a1) receiving analog signals from the coarse and fine resolvers in each resolver unit; and (a2) converting the analog signals received in step (a1) into digital signals representing the position of the neutron flux detector associated with each resolver unit.

* * * * *